United States Patent [19]

Apfel et al.

[11] Patent Number: 4,768,289

[45] Date of Patent: Sep. 6, 1988

[54] COBALT BASE ALLOY COATING FOR A GUIDE BAR OF A CHAIN SAW

[75] Inventors: Norbert Apfel; Wilfried Noll; Hans-Peter Stehle, all of Waiblingen; Horst Dören, Titz-Rödingen; Klaus-Dieter Wernicke, Ratingen, all of Fed. Rep. of Germany

[73] Assignee: Andreas Stihl, Waiblingen, Fed. Rep. of Germany

[21] Appl. No.: 4,907

[22] Filed: Jan. 20, 1987

[30] Foreign Application Priority Data

Jan. 17, 1986 [DE] Fed. Rep. of Germany ....... 3601206

[51] Int. Cl.$^4$ .............................................. B27B 17/02
[52] U.S. Cl. .................................... 30/383; 76/25 R; 420/436
[58] Field of Search ................................. 30/383–387; 76/25 R; 420/436

[56] References Cited

U.S. PATENT DOCUMENTS 3,582,320  6/1971  Herchenroeder .................... 420/436
3,858,321  1/1975  Comaty ................................ 30/383

Primary Examiner—Douglas D. Watts
Attorney, Agent, or Firm—Walter Ottesen

[57] ABSTRACT

A cobalt base alloy includes the alloy elements of nickel, chromium, tungsten, silicon and carbon with the nickel content being at least 25 percent by weight. The cobalt base alloy is applied as a coating material for guide bars of saw chains. The alloy has a high hardness with low brittleness by means of which an improved resistance to wear is achieved.

10 Claims, 1 Drawing Sheet

COBALT BASE ALLOY COATING FOR A GUIDE BAR OF A CHAIN SAW

FIELD OF THE INVENTION

The invention relates to a cobalt base alloy coating for a guide bar of a chain saw. The coating includes nickel, chromium and tungsten as alloy materials.

BACKGROUND OF THE INVENTION

For guide bars of chain saws it is conventional to reinforce the forward region of the guide bar with a hard-metal alloy for increasing the resistance to wear at the region of the guide bar where the saw chain is turned around through an angle of 180°. For this purpose, a hard metal alloy is applied to the base material of the guide bar, for example, by welding. As a coating material, cobalt hard metal alloys are used for example and are known for instance under the designation stellite 6 or stellite 12. Stellite 6 is a cobalt base alloy which includes 28 percent by weight of chromium, 4 percent by weight of tungsten and up to 1.1 percent by weight of nickel. Stellite 6 as a coating material for guide bars has up to now been effective; however, it is no longer satisfactory for all use conditions with respect to its resistance to wear and its toughness in view of the advancing development of chain saws which tend to be of higher capacity and higher rotational speed. Especially for high requirements with respect to resistance to wear, this material is too soft as a consequence of which several manufacturers have transferred to a harder material such as stellite 12 for guide bars subjected to high loading.

The material known under the designation stellite 12 is a cobalt base alloy having 29 percent by weight of chromium, 8 percent by weight of tungsten and 1.3 percent by weight of carbon. Although this material exhibits a significantly higher hardness than stellite 6, other problems occur because of the brittleness of the material which greatly affects the resistance to wear of the guide bar. Especially in a case of a saw chain which is not adequately tensioned (adequate tensioning cannot always be assured during continuous use of the chain saw), the situation can occur that the saw chain lifts off of the guide bar and impinges thereon with considerable impact when the speed of the chain is high and the cutting times are short such as when cutting off branches. Since the coating material stellite 12 has a hexagonal lattice structure, it cannot be cold formed and is therefore very brittle which can cause the coating material to break when the saw chain hits and parts thereof can break away therefrom. For this reason, stellite 12 is not suitable as a coating material for guide bars.

A further cobalt base alloy is known under the designation stellite F and includes 22 percent by weight of nickel, 12 percent by weight of tungsten, 2 percent by weight of carbon and 1 percent by weight of silicon. This alloy is not suitable as a coating material for guide bars.

SUMMARY OF THE INVENTION

In view of the above, it is an object of the invention to provide a cobalt base alloy which has a higher resistance to wear with a lower brittleness in comparison to the known alloys of this kind. It is a further object of the invention to provide a guide bar coated with this alloy.

The cobalt base alloy material as a coating material for the guide bar of a chain saw includes: cobalt, chromium, tungsten, silicon, carbon and at least 25 percent by weight of nickel. With this composition of the alloy, a most wear resistant coating material is provided which exhibits a higher resistance against abrasive wear because of its at least partially cubic face-centered lattice and which can be cold formed within certain limits. Because of the high nickel content (equal to or greater than 25 percent by weight), the condition is obtained that the lattice structure of the alloy is at least partially face-centered with the cobalt portion of at least 25 percent by weight providing a high resistance to heat.

The cobalt base alloy according to the invention includes the following alloy components in the amounts indicated: nickel 25 to 35 percent by weight, chromium 26 to 32 percent by weight, tungsten 4 to 5 percent by weight, silicon 2.0 to 2.8 percent by weight, carbon 1.3 to 1.6 percent by weight, the cobalt content of the alloy being in all instances at least 25 percent by weight.

A significant increase of the hardness of the coating material can be achieved by cold forming after welding to the base material. In this way, an increase of the hardness from 400 to 500 HV is possible.

BRIEF DESCRIPTION OF THE DRAWING

The invention will now be described with reference to the drawing wherein.

DESCRIPTION OF THE PREFERRED EMBODIMENTS OF THE INVENTION

Figure 1A:
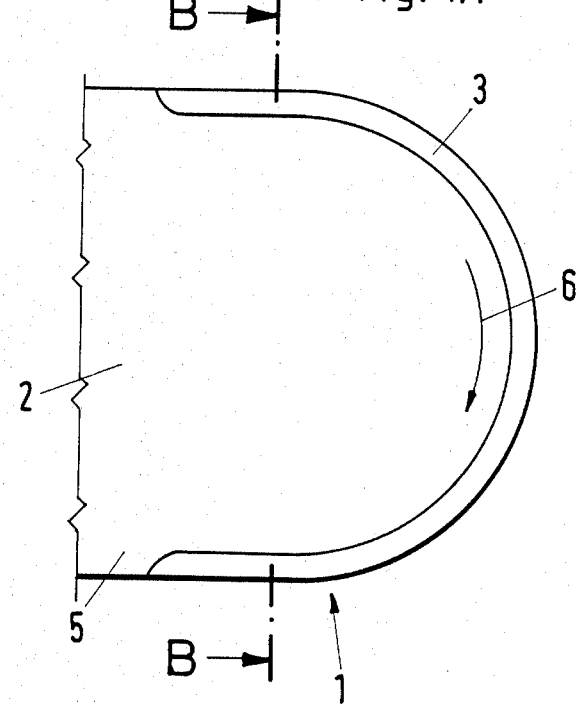
FIG. 1A is a side elevation view of the front portion of a guide bar armor clad or coated in the turn-around region thereof.
Figure 1B:
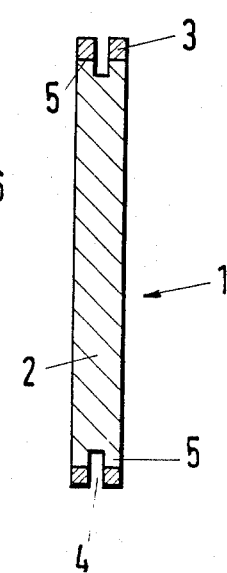
FIG. 1B is a section view taken along the line B—B of FIG. 1A.

The guide bar 1 shown in FIG. 1 includes a base material 1 which can be steel for example to which a coating material in the form of a cobalt base alloy has been welded to the narrow edge thereof in the forward curved region. The guide bar is correspondingly worked for example by grinding after welding so that the form shown in FIG. 1 is reached especially as shown in the section view according to FIG. 1B.

The guide bar 1 includes a guide groove 4 over its entire outer periphery beyond which the mutually adjacent side portions 5 of the bar project to conjointly define the groove. The front faces of the side portions 5 are provided with the coating material 3 in the region of the forward turn-around through an angle of 180° and into the linearly-extending portion of the bar as shown in FIG. 1A. During operation, the saw chain runs in the direction of arrow 6 and is held against a lateral departure from the guide bar by guide links which lie in the guide groove 4. The pressure transmitted to the chain during cutting is transmitted to the front faces of the side portions 5 by means of which the bracing of the saw chain is assured. In the forward region of the guide bar shown in FIG. 1, the saw chain is guided through 180° by means of which intense frictional forces and high temperatures can occur in this region.

For this region, the side portions 5 are provided with a high wear resistant coating material 3.

In the illustrated embodiment, the coating material is a cobalt alloy comprising 25 percent by weight of nickel, 26 percent by weight of chromium, 4 percent by weight of tungsten, 2 percent by weight of silicon and 1.3 percent by weight of carbon.

Figure 2:
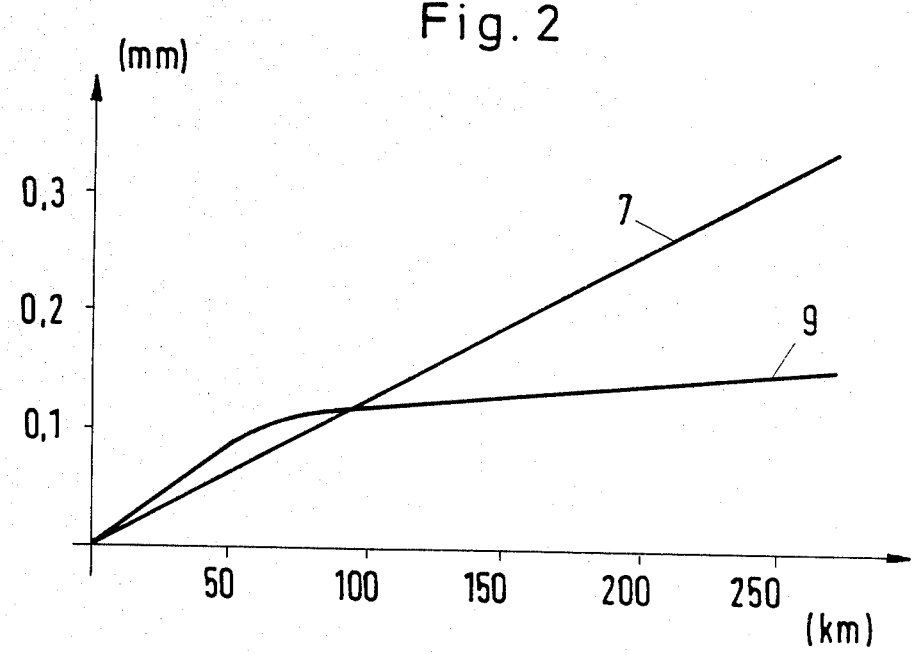
FIG. 2 is a graphical representation showing the wear (vertical axis) plotted against the distance travelled by the saw chain (km) along the slide path of the saw chain for two cobalt based alloys.

In FIG. 2, the characteristic wear curves of two cobalt base alloys are shown with the curve designated by numeral 7 corresponding to stellite 6 described above and the curve with numeral 9 corresponding to the alloy according to the invention. As shown by the course of the curves, the alloy according to the invention at first has a steeper slope than curve 7 which indicates a higher wear in the initial phase of use. This can be explained in that the coating material of the invention at first has not reached its final hardness; this is achieved for example first during operation by means of a corresponding cold forming in the form of the loading caused by the rotating saw chain. After the coating material has been correspondingly cold formed, its hardness increases so far (see FIG. 2) that its wear is significantly less than the known material 7 (stellite 6). It is noted that the diagram according to FIG. 2 characterizes the wear of correspondingly coated or plated guide bars.

In order to increase the resistance to wear of the guide bars described, the cobalt base alloy can be cold formed after welding by means of shot-peening, hammering or the like so that already at the beginning of operational use, the desired high hardness of, for example 500 HV, is provided thereby providing ab initio the highest resistance to wear as shown by the flat portion of curve 9.

It is understood that the foregoing description is that of the preferred embodiments of the invention and that various changes and modifications may be made thereto without departing from the spirit and scope of the invention as defined in the appended claims.

What is claimed is:

1. A guide bar of a chain saw for guiding a saw chain, the guide bar being a flat member defining a plane and comprising:
    a peripheral metal edge having two mutually adjacent wall-like projections extending therefrom in a direction parallel to said plane so as to conjointly define a guide path for guiding the saw chain as it moves around the guide bar;
    a cobalt base alloy material coating welded directly to said projections for improving the resistance to wear of said projections; and,
    said alloy material being an alloy containing cobalt, chromium, tungsten, silicon in an amount equal to or greater than 2.0 percent by weight, carbon in an amount equal to or greater than 1.3 percent by weight and at least 25 percent by weight of nickel.

2. The cobalt base alloy material of claim 1, comprising said silicon in an amount between 2 to 2.8 percent by weight and carbon in an amount between 1.3 to 1.6 percent by weight.

3. A guide bar of a chain saw for guiding a saw chain, the guide bar being a flat member defining a plane and comprising:
    a peripheral metal edge having two mutually adjacent wall-like projections extending therefrom in a direction parallel to said plane so as to conjointly define a guide path for guiding the saw chain as it moves around the guide bar;
    a cobalt base alloy material coating welded directly to said projections for improving the resistance to wear of said projections; and,
    said alloy material being an alloy containing: said cobalt in an amount of 25 to 29 percent by weight; said chromium in an amount between 26 to 32 percent by weight; said silicon in an amount between 2 to 2.8 percent by weight; said carbon in an amount between 1.3 to 1.6 percent by weight; said tungsten in an amount between 4 to 5 percent by weight; and, said nickel in an amount of at most 35 percent by weight.

4. A guide bar of a chain saw for guiding a saw chain, the guide bar being a flat member defining a plane and comprising:
    a peripheral metal edge having two mutually adjacent wall-like projections extending therefrom in a direction parallel to said plane so as to conjointly define a guide path for guiding the saw chain as it moves around the guide bar;
    a cobalt base alloy material coating welded directly to said projections for improving the resistance to wear of said projections; and,
    said alloy material being an alloy consisting of: said cobalt in an amount of 25 to 29 percent by weight; said chromium in an amount between 26 to 32 percent by weight; said silicon in an amount between 2 to 2.8 percent by weight; said carbon in an amount between 1.3 to 1.6 percent by weight; said tungsten in an amount between 4 to 5 percent by weight; and, said nickel in an amount of at most 35 percent by weight.

5. The cobalt base alloy material of claim 1, comprising said cobalt in an amount between 25 to 59 percent by weight.

6. The cobalt base alloy material of claim 1, comprising said chromium in an amount between 26 to 32 percent by weight.

7. The cobalt base alloy material of claim 1, comprising said silicon in an amount between 2 to 2.8 percent by weight.

8. The cobalt base alloy material of claim 1, comprising said carbon in an amount between 1.3 to 1.6 percent by weight.

9. The cobalt base alloy material of claim 1, comprising said tungsten in an amount between 4 to 5 percent by weight.

10. The cobalt base alloy material of claim 1, comprising said nickel in an amount of at most 35 percent by weight.

* * * * *

UNITED STATES PATENT AND TRADEMARK OFFICE
CERTIFICATE OF CORRECTION

PATENT NO. : 4,768,289

DATED : September 6, 1988

INVENTOR(S) : Norbert Apfel, Wilfried Noll, Hans-Peter Stehle, Horst Dören and Klaus-Dieter Wernike It is certified that error appears in the above-identified patent and that said Letters Patent is hereby corrected as shown below:

On the title page, under "Assignee:", after "of Germany", please add -- and Böhler Aktiengesellschaft, Düsseldorf, Federal Republic of Germany --.

Signed and Sealed this

Twentieth Day of March, 1990

Attest:

JEFFREY M. SAMUELS

Attesting Officer

Acting Commissioner of Patents and Trademarks